March 6, 1928. 1,661,597
L. J. BUTTOLPH
WATER COOLED LAMP
Filed Jan.1, 1924 2 Sheets-Sheet 1
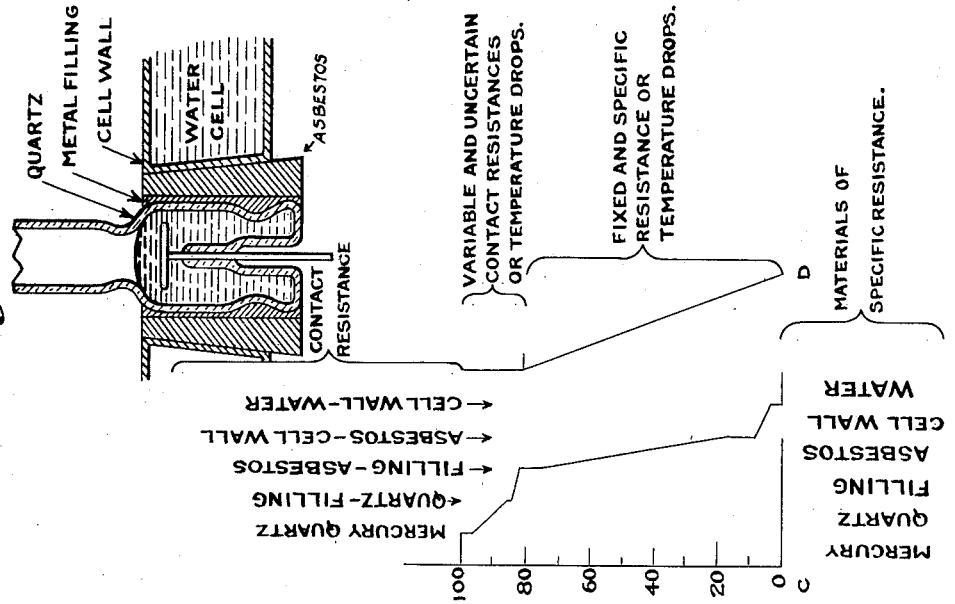
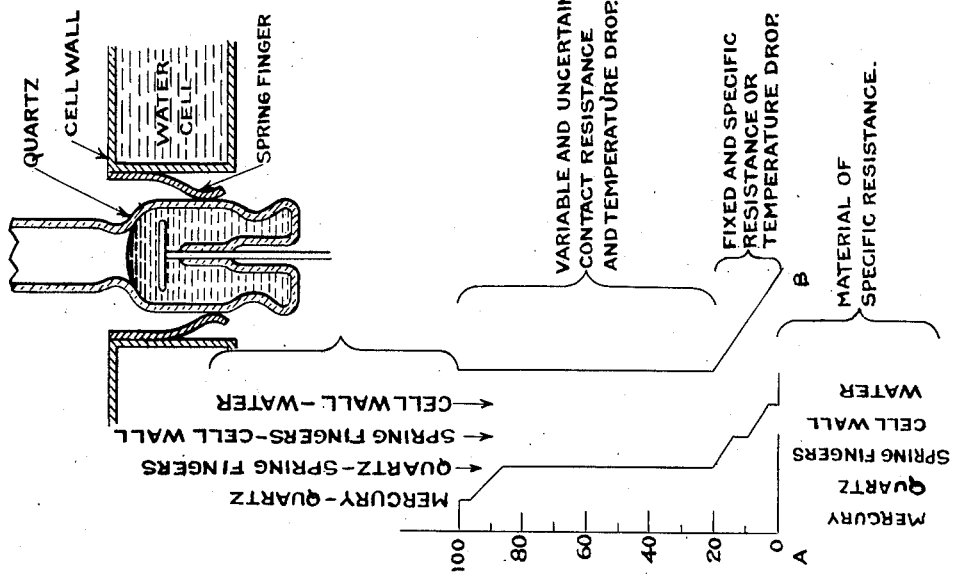
INVENTOR
Leroy J. Buttolph
BY
Thos. F. Brown
HIS ATTORNEY March 6, 1928.                  1,661,597
L. J. BUTTOLPH
WATER COOLED LAMP
Filed Jan. 1, 1924           2 Sheets-Sheet 2
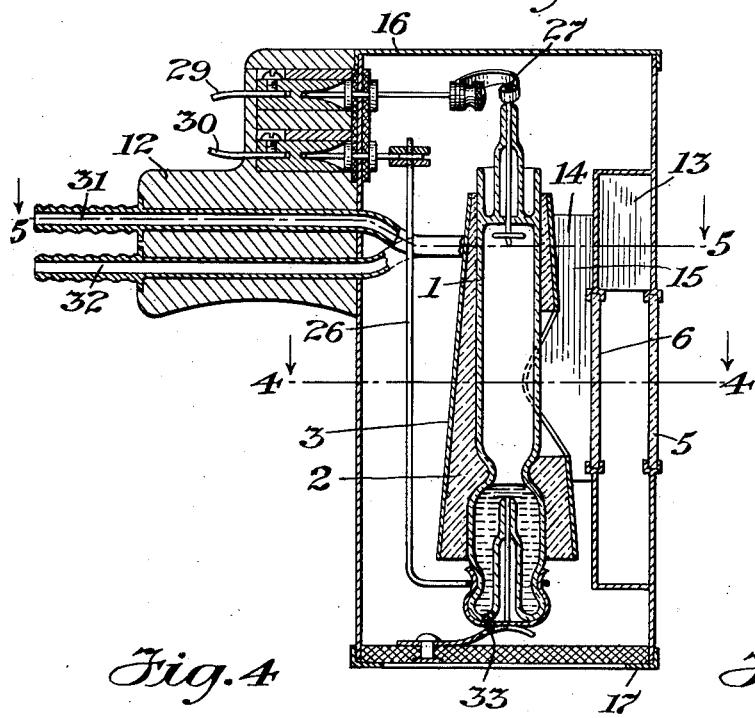
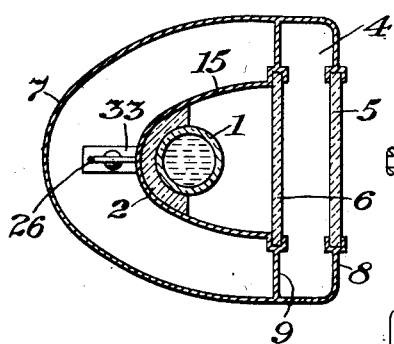
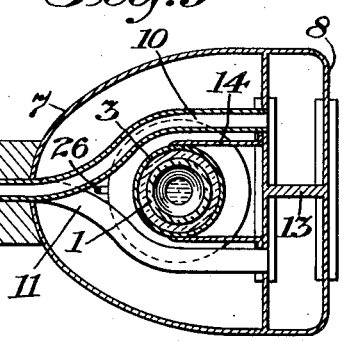
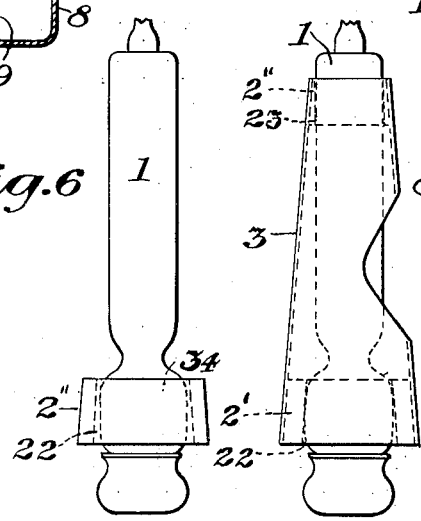
INVENTOR
Leroy J. Buttolph
BY Thos H. Brown
HIS ATTORNEY Patented Mar. 6, 1928.

1,661,597

UNITED STATES PATENT OFFICE.

LEROY J. BUTTOLPH, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

WATER-COOLED LAMP.

Application filed January 1, 1924. Serial No. 683,844.

The present invention relates to methods of and apparatus for controlling radiant energy devices and maintaining said devices at required critical operating temperatures, and useful in the arts generally. By way of example I shall describe my invention in connection with the production of a new electric light radiating apparatus useful in the arts generally and particularly in the therapeutic art where diseases are treated by means of radiations from a light source giving off ultra-violet rays, and which source is maintained at a desired critical operating temperature by my invention, although it will be understood that my invention is not limited to such devices.

I have discovered, when operating a quartz lamp having a solid anode and a liquid cathode therein and an arc path of one or two inches on commercial circuits that it is impossible to maintain such a small sized lamp in efficient operation on commercial circuits without the use of external heat radiating devices. As is generally known in the art the anode and cathode should be kept at considerably lower temperature than the arc path, especially the cathode. On the other hand the arc path and the mercury vapor thereof is required to be kept at a characteristic operating temperature in order to maintain the proper resistance and pressure of the vapor which serves as the arc path.

I find that the lamps as turned out in quantity production are not uniform in their total outside area or in their diameters at the same point in the lengths of the different lamps but that they vary within given limits. This variation in diameter and area results in a variation in the amount of heat radiated from the lamp wall by the different lamps operating under substantially similar operating conditions and this variation in the amount of heat radiation by the different lamps under such conditions is found to be within certain limits.

It is an object of my invention to provide methods and means for conducting heat from a source of radiant energy attendant upon the generation of which is a generation of heat, thus controlling and maintaining a temperature at the said source consistent with the operating characteristics thereof.

It is also an object of this invention to provide cooling means for such a lamp which will function effectively on any one lamp of a given production lot having operating characteristics within certain predetermined limits.

Incidental to the production of light in an electrically energized lamp there is produced a considerable quantity of heat which for the practical handling of the lamp must in some way be dissipated. In the use of a high temperature quartz mercury vapor lamp in a manually operated and artificially cooled lamp outfit there is necessarily a considerable difference in temperature between the lamp itself and the casing about it. For example, where it is necessary to operate a high intensity high temperature quartz mercury arc lamp, enclosed in a compact and relatively cold water cooled casing, the high temperature gradient between the quartz lamp and the water cooled casing makes the temperature control of the lamp itself somewhat difficult. This is particularly the case where the design is such as to make necessary some specific cooling of the lamp by direct thermal conduction from the burner to the casing, the fundamental difficulty being the mechanical one of securing heat conducting devices which will function uniformly with various burners whose dimensions vary. This difficulty has been inherent in the metallic rings, tongues, springs, fins, etc., previously used for this purpose, because these "contactors" have themselves been of so high thermal conductivity as to take the temperature of that part of the apparatus to which they have been most positively connected, whether that be the quartz lamp or the water cooled casing. And in use, the large temperature gradient above referred to, has existed practically at the point of contact between the "contactor" and the casing, or the lamp, depending upon the type of construction used.

The phenomenon of heat conduction takes place because of and only in case of a difference in temperature between two points connected by a medium capable of conducting heat. The rate of heat flow is then proportional to the conductivity of the medium and to the temperature gradient while the time to attain equilibrium varies inversely as these two factors. So long as there is a flow of energy in any given direction there is of necessity a continuous difference in temperature or a potential gradient between the successive points along the line of flow. This conduction or flow of heat is always in the direction from the point of higher to the point of lower temperature, and continues until there is static equilibrium or no difference in temperature.

Where conditions are such that heat is supplied to a given point at a fixed rate there is a rise in the temperature of the point of supply relative to the point of removal and an increase in the rate of heat transmission between the points until the condition of dynamic equilibrium obtains when the rate of transmission of heat becomes a constant determined directly by the temperature gradient and by the conductivity of the medium.

Assuming a given rate of heat transmission through the medium the temperature gradient throughout is only uniform for uniform conductivity. Uniform conductivity in a medium is in general only obtainable by perfect homegeneity and an unvarying composition in the medium. In practical work a given medium may be made of several different chemical compositions in its various successive parts and these in turn may be connected with each other by varying degrees of contact. The medium may then be considered as a system of resistances connected in series and having a conductivity equal to the reciprocal of the sum of their various resistances. For the present purpose four resistance factors may be distinguished in such a system, the composition, the cross-sectional area, the length, and the contact between successive units. The first three are relatively simple in their practical applications, but the fourth is not so well understood in either theory or practice and is generally the most important factor in any discontinuous heat conducting system.

Where close control of the rate of heat conduction or the temperature gradient is required contact resistance in the system is often a source or trouble as it is unstable and generally large relative to the specific resistances of the other units of the conducting system.

Thus in the quartz lamp and water cooled casing apparatus above referred to, the heat conducting system has generally consisted of brass or copper tongues or fins, etc., attached to and conducting heat to the water cooled casing or cell and contacting at very small points with the cathode chamber of the lamp. These very small points of contact vary in their contacting area and nearly the total resistance of the system has been of this variable contact nature there being a temperature gradient of some 200 to 300 degrees through the brass or copper-quartz-glass points of contact. As a result there have been great differences in these contact resistance factors with every combination of lamp and cooling casing or cell and great difficulties in the proper control of this factor for any given combination.

To avoid the difficuties inherent in this method of making thermal contact with the lamp, I connect the burner with its cooling casing by a medium such as bakelite, asbestos cement, metal, alloys, etc., molded or otherwise formed on the lamp wall, of any desired and easily predetermined heat conductivity, and so machined and fitted, taper fitted if desired, to the casing as to reduce to a negligible minimum the contact resistance.

To avoid variations in radiation in lamps as turned out in quantity production due to variations in diameters and lamp wall area within given limits in lamps having operating characteristics within given limits or to secure good thermal contact between the heat conducting medium and the lamp wall, in each case for the purpose of securing a heat radiation capacity constant within given limits in accordance with the above mentioned variations, I make the aforementioned medium of bakelite, or asbestos, etc., in the form of a sleeve of slightly larger diameter than that of the lamp at the point of application and pour or otherwise admit between the lamp wall and the contiguous inner wall of said sleeve a contacting and holding means of a material having good thermal conductivity such as solder or cement. This allows the making in production of such sleeves with substantially constant heat input and output area values and heat path values which together with the operating characteristics and areas of the lamps which are within given limitations secures and allows constant operating conditions within given limits. In such a system there is substantially the same temperature gradient as referred to above, but instead of the high gradient being substantially at points of contact only, there is a relatively low gradient distributed uniformly throughout a medium of uniform specific conductivity, the contact resistance factors being reduced to the point where they have very little effect on the resistance of the system as a whole. The outer surface of this form is machined to make a tight fit, or taper fitted, if desired, with the inner wall of the water cooled casing. Thus in operation the inner part of this form would be at approximately the temperature of the quartz lamp cathode chamber while the outer surface would be at approximately the temperature of the water cooled jacket. The cooling of the lamp would then be in all cases, and largely regardless of small variations in the lamp itself, a simple function of the thermal conductivity of this composition form. This thermal conductivity would be a constant for all quartz lamps, and hence no individual adjustments for various lamps would be necessary in assembling, or in substituting one lamp for another in a casing. In so far as variations in the normal operating characteristics of the lamp are desirable for various uses of the lamp they are made by varying the rate of water flow through the casing. Variations in the temperature of the cooling water in the same manner are compensated for by varying the rate of water flow.

As a material for this form I use the various asbestos and phenol condensation compositions of low melting metals now on the market inasmuch as these materials may be chosen of satisfactorily high heat resisting qualities and of various thermal conductivities.

In the accompanying drawings which form a part of this application:

Fig. 1 is a view in section of a cathode chamber of a mercury vapor lamp having a water cell therefor and a spring finger for making thermal contact therebetween, and graphs showing the temperature gradients in and between the various parts thereof.

Fig. 2 is a view in section of a cathode chamber of a mercury vapor lamp having a water cell therefor and a medium therebetween having contact throughout a considerable area with the walls of said chamber and said water cell, and graphs showing the temperature gradients in and between the various parts thereof.

Fig. 3 is a vertical sectional view of a hand lamp outfit in which a sleeve of asbestos compound material or the like extends substantially the length of the lamp and is formed directly about the lamp and molded or machined to fit a metal enclosing and holding jacket with good thermal surface contact.

Fig. 4 is a section through line 4—4 of Fig. 3.

Fig. 5 is a section through line 5—5 of Fig. 3.

Fig. 6 is a diagrammatic representation in elevation of a lamp with a sleeve about the cathode chamber thereof and affixed thereto by a filling between the sleeve and the chamber wall.

Fig. 7 is a diagrammatic representation in elevation of a lamp with a sleeve about the cathode chamber and another about the lamp at the anode, both fixed to the lamp by fillings between the sleeve and the lamp, and a jacket into which both sleeves fit.

In Figs. 1 and 2 of the drawing I have made a graphic representation of the temperature gradients through various parts of the heat dissipating systems of the old form which used metal fingers for establishing thermal contact between the lamp and a water cell (Fig. 1) and of an embodiment of my present invention in which is used a medium of a heat conductance suitable for large contact areas between it and the lamp and between it and a water cell and which is fixed to the lamp by a metal filling therebetween such as solder which has been poured into a space provided between them (Fig. 2).

In Fig. 1 is shown in section a cathode chamber of a mercury vapor lamp and a water cell thereabout. Fixed to the water cell are spring fingers which contact with the cathode chamber wall. In graph A of Fig. 1 is plotted the temperature gradient between the mercury of the lamp and the water of the cell in percentages through the various materials of the heat conducting system and the various points of contact therethrough. In this graph and in the similar one in Fig. 2 the temperature gradients between contacting surfaces are necessarily indicated by substantially vertical lines since the temperature differences in the contacting materials are indicated by sloping lines since there the difference in temperature between the contacting surfaces of each several part is gradual. In this graph A the temperature drops or gradient in and between various parts in percentages of the total temperature drop between the mercury of the lamp and the water cell is tabulated as follows:

| | Per cent. |
|---|---|
| Mercury of lamp and lamp wall | 4 |
| Lamp wall—inner surface to outer surface | 10 |
| Outer surface lamp wall spring finger | 66 |
| Spring finger, lamp end to water cell end | 6 |
| Spring finger and water cell wall | 6 |
| Water cell wall, outer surface to inner surface | 4 |
| Water cell wall and water | 4 |
| Mercury of lamp and water of water cell | 100 |

This table shows that of the total temperature drop between the mercury of the lamp and the water of the cooling water cell 80% is between contacting surfaces the heat resistance between which is of an unstable and variable and not easily controllable nature while only 20% of the drop is through material having a specific resistance which may be predetermined simply by the use of desired materials (see graph B).

In Fig. 2 is shown in section a cathode chamber of a mercury vapor lamp which has a sleeve of molded asbestos compound affixed to it by a metal filling poured between them. The sleeve has been machine turned to taper fit the surrounding water cell with good surface contact. The temperature drop through the various parts and across the various surface contacts in percentages of the total temperature drop between the mercury of the lamp and the water of the cell are tabulated as follows (note graph C):

| | Per cent. |
|---|---|
| Mercury of lamp and inner surface of lamp wall | 4 |
| Lamp wall, inner surface to outer surface | 10 |
| Outer surface of lamp wall and metal filling | 2 |
| Metal filling | 2 |
| Metal filling and asbestos compound sleeve | 4 |
| Asbestos compound sleeve | 64 |
| Asbestos compound sleeve and water cell wall | 6 |
| Water cell wall, outer surface to inner surface | 4 |
| Water cell wall, inner surface and water | 4 |
| Mercury of lamp and water of water cell | 100 |

As depicted in graph D only 20% of the total temperature drop or gradient is through contact resistance while 80% of it is through materials having specific resistance which can be predetermined and 67% through the asbestos compound sleeve. Now thus it is quite apparent that by predetermining the nature and characteristics of this material that very stable control is obtainable of the amount of heat conducted from the lamp to the water cell. And it is equally apparent that in the other example used, that of the contacting finger type outfit, that control is highly unstable on account of the very small area with which such fingers contact with the lamp (or water cell if so used) and the high percentage of the temperature drop through such contacts as compared with the total temperature drop (66% as noted above and shown in graph A).

Referring to Fig. 3, 4, and 5 of the drawings the lamp 1 is surrounded throughout the greater portion of its length by heat conducting medium 2 which is of material such as cement, bakelite, or metal formed thereon as by moulding or casting and which has a light conducting opening therethrough between its extremities. The lamp is surrounded longitudinally by a closure comprising the water cell 4 and the casing 7 extending between the lateral extremities of the water cell and around the lamp and extending upwardly from the top and bottom of the water cell. The caps 16 and 17 at the top and bottom of the casing complete the closure for the lamp. The electrical conductors 29 and 30 passing through the casing and insulated therethrough in a suitable manner serve to connect a suitable source of electric current to the lamp through the conductors 26 and 27 which also serve to hold the lamp in its proper position in the casing. The spring 33 fixed on the inside of the bottom cap 17 aids in the proper positioning and holding of the lamp. As shown, the medium 2 is formed as a frustum of a cone tapering toward the top and fits into the jacket 3 which is preferably of metal, which has a light conducting opening registering with that of the medium 2, and which is detachably or permanently fixed to the water cell 4 and by means of the vanes or fins 14 which also serve as a thermal contact between the jacket 3 and water cell 4. These fins 14 extend substantially the length of jacket 3 and are formed near the light conducting opening of jacket 3 into a reflector and enlarged light conducting passageway as shown at 15 in Fig. 4. At the point of juncture of enlargements 15 of vanes 14 which the inner wall 9 of the water cell 4 is mounted in said wall 9 a lens 6 which for use in the application of ultra violet light is made of silica or some other material transparent to ultra violet light. Registering with lens 6 and said openings in jacket 3 and medium 2 is a lens 5 mounted in the front wall 8 of water cell 4 and which is of similar material to that of lens 6. These lenses have water tight seals between them and the walls in which they are respectively mounted. Through the handle 12 which is fixed to the back of casing 7 are liquid conducting pipes 31 and 32 which serve for connection with a water supply and exhaust. Said pipes 31 and 32 connect through pipes 10 and 11 respectively to the upper part of the water cell 4 on either side of the partition 13 which extends from the top of water cell 4 to the lenses in the front and back walls thereof and which serve to distribute the water through said cell and to insure proper cooling circulation therethrough.

In the operation of my device water is circulated from the source and to the exhaust through the pipes 31 and 32 and thereby through the water cell 4 with the cooling liquid in circulation, the lamp is started into operation by tilting the outfit so that the mercury of the lamp bridges the gap between the electrodes thereof and then breaks the connection thus established whereupon the arc is formed between said electrodes. At the instant of starting because of the low temperature in the lamp the voltage drop across it is low and is controlled by a stabilizing resistance in the auxiliaries usual to said lamps and not here shown. This initial current is necessarily high and the mercury of the lamp heats up rapidly raising the vapor pressure of the mercury in the lamp and at the same time raising the arc voltage. This process continues until such time as the heat energy in the lamp establishes equilibrium with the cooling members about the lamp. This equilibrium temperature is determined by the conductivity of medium 2 and its thermal connections to the lamp and the water cell 4.

The radiations to be utilized either in therapy or in general illumination pass through the lenses 5 and 6 with the water between them which serves to cool the lenses and to take out the radiant energy which the cooling medium may absorb, although it will be understood that the heat rays may also be utilized for useful purposes in which case the cooling medium must be selected that is transparent to the said rays. This latter of course is a matter of design and selection well within the ken of those skilled in the art.

As shown in Fig. 6 in another form of my invention the heat conducting medium 2″ about the lamp is formed principally about the cathode chamber 34 of lamp 1.

Fig. 7 shows a lamp 1 having the medium formed in two parts 2′ and 2″ as rings, respectively, one about the cathode chamber of the lamp and the other about the anode. Both of these are shown as being tapered to fit the interior of the jacket 3 to which they will be fitted and fixed to the lamp by means of metal 22 and 23 poured between the lamp wall and the rings.

In the foregoing specification the problem has been handled from the viewpoint of heat conduction, but it will be understood that it is as readily explainable and effective in terms of applying cooling effects through the member to the device to be controlled.

I claim as my invention:

1. In a water cooled lamp, in combination, a lamp holding tube, a water cell in thermal contact therewith, means for circulating water through said cell, said tube and cell having registering light conducting passageways, and a casing extending between the sides of said water cell and enclosing said tube, said tube being in the form of a conical frustum.

2. In a water cooled lamp, in combination, a lamp holding tube, a water cell in thermal contact therewith, means for circulating water through said cell, said tube and cell having registering light conducting passageways, a casing extending between the sides of said water cell and around said tube, and caps completing a closure with said water cell and said casing, said tube being in the form of a conical frustum.

3. In a water cooled lamp, in combination, a lamp holding tube, a water cell in thermal contact therewith, means for circulating water through said cell, said tube and cell having registering light conducting passageways, a casing extending between the sides of said water cell and around said tube, and caps completing a closure with said water cell and said casing, a lamp in said tube and electrical conductors for said lamp passing through said closure and a thermal contact medium positioned between said tube and said lamp of a material of low heat conductivity.

4. In a water cooled lamp, in combination, a lamp holding tube, a water cell in thermal contact with said tube, a pair of lenses mounted in openings in opposite walls of said water cell and registering with said tube apertures, a casing extending between the limits of said cell and about said tube, caps completing a closure with said casing and cell for said tube, a water conducting passageway to and from said water cell, an electric lamp in said tube and conductors therefor passing through said closure and a thermal contact medium positioned between said tube and said lamp of a material of low heat conductivity.

5. In a water cooled lamp, in combination, a lamp, a jacket thereabout and a heat conducting medium having contact with the lamp and the jacket substantially throughout the lengths thereof, said jacket and medium having registering light conducting openings therethrough.

Signed at Hoboken in the county of Hudson and State of New Jersey this 28th day of December A. D. 1923.

LEROY J. BUTTOLPH.